United States Patent
Park et al.

(10) Patent No.: US 11,900,629 B2
(45) Date of Patent: *Feb. 13, 2024

(54) SURFACE PROFILE ESTIMATION AND BUMP DETECTION FOR AUTONOMOUS MACHINE

(71) Applicant: NVIDIA Corporation, Santa Clara, CA (US)

(72) Inventors: Minwoo Park, Saratoga, CA (US); Yue Wu, Mountain View, CA (US); Michael Grabner, Redmond, WA (US); Cheng-Chieh Yang, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,770

(22) Filed: Feb. 27, 2023

(65) Prior Publication Data

US 2023/0230273 A1    Jul. 20, 2023

Related U.S. Application Data

(63) Continuation of application No. 17/103,680, filed on Nov. 24, 2020, now Pat. No. 11,657,532.

(Continued)

(51) Int. Cl.
  *G06T 7/60* (2017.01)
  *G06T 7/579* (2017.01)
  *G06V 20/56* (2022.01)

(52) U.S. Cl.
  CPC .............. *G06T 7/60* (2013.01); *G06T 7/579* (2017.01); *G06V 20/588* (2022.01);
  (Continued)

(58) Field of Classification Search
  None
  See application file for complete search history.

(56) References Cited

U.S. PATENT DOCUMENTS

| | | | | |
|---|---|---|---|---|
| 5,065,618 A | * | 11/1991 | Hodges, Sr. | ............. G01C 7/04 |
| | | | | 73/146 |
| 10,745,005 B2 | * | 8/2020 | Herman | .................... G06T 7/60 |

(Continued)

FOREIGN PATENT DOCUMENTS

| | | | |
|---|---|---|---|
| DE | 102012112164 A1 | | 6/2014 |
| DE | 102015121537 A1 | * | 6/2017 |

(Continued)

OTHER PUBLICATIONS

Park, Minwoo; Non-Final Office Action for U.S. Appl. No. 17/103,680, filed Nov. 24, 2020, dated Aug. 5, 2022, 20 pgs.

(Continued)

*Primary Examiner* — Delomia L Gilliard
(74) *Attorney, Agent, or Firm* — Taylor English Duma L.L.P.

(57) ABSTRACT

In various examples, surface profile estimation and bump detection may be performed based on a three-dimensional (3D) point cloud. The 3D point cloud may be filtered in view of a portion of an environment including drivable free-space, and within a threshold height to factor out other objects or obstacles other than a driving surface and protuberances thereon. The 3D point cloud may be analyzed—e.g., using a sliding window of bounding shapes along a longitudinal or other heading direction—to determine one-dimensional (1D) signal profiles corresponding to heights along the driving surface. The profile itself may be used by a vehicle—e.g., an autonomous or semi-autonomous vehicle—to help in navigating the environment, and/or the profile may be used to detect bumps, humps, and/or other protuberances (Continued)

along the driving surface, in addition to a location, orientation, and geometry thereof.

20 Claims, 13 Drawing Sheets

Related U.S. Application Data

(60) Provisional application No. 62/946,689, filed on Dec. 11, 2019.

(52) U.S. Cl.
CPC ...... *G06T 2200/08* (2013.01); *G06T 2207/10028* (2013.01); *G06T 2207/30256* (2013.01)

(56) References Cited

U.S. PATENT DOCUMENTS

| | | | | |
|---|---|---|---|---|
| 10,885,698 | B2* | 1/2021 | Muthler | G06N 3/084 |
| 11,657,532 | B2 | 5/2023 | Park et al. | |
| 2013/0234029 | A1* | 9/2013 | Bikumandla | H01L 25/043 257/432 |
| 2014/0107988 | A1* | 4/2014 | Morton | G06F 17/00 703/2 |
| 2015/0339541 | A1* | 11/2015 | Fan | G06T 7/33 382/154 |
| 2018/0121762 | A1* | 5/2018 | Han | G06V 10/82 |
| 2018/0225515 | A1* | 8/2018 | Jiang | G06F 18/2411 |
| 2018/0268256 | A1* | 9/2018 | Di Febbo | G06V 10/757 |
| 2019/0026953 | A1* | 1/2019 | Del Angel | G06T 19/20 |
| 2019/0243371 | A1* | 8/2019 | Nister | G05D 1/0231 |
| 2019/0286153 | A1* | 9/2019 | Rankawat | G05D 1/0246 |
| 2019/0303510 | A1* | 10/2019 | Morton | G06F 17/11 |
| 2021/0026361 | A1* | 1/2021 | Ravi | G06F 17/11 |
| 2021/0148709 | A1* | 5/2021 | Kumar | G01S 7/4802 |
| 2021/0183093 | A1* | 6/2021 | Park | G06V 20/588 |
| 2021/0325892 | A1* | 10/2021 | Nister | B60W 30/09 |
| 2022/0222642 | A1* | 7/2022 | Tax | G06Q 20/206 |

FOREIGN PATENT DOCUMENTS

| | | |
|---|---|---|
| DE | 102015121537 A1 | 6/2017 |
| WO | 2014090247 A1 | 6/2014 |
| WO | 2018182538 A1 | 10/2018 |
| WO | WO-2018182538 A1 * 10/2018 | ............ G01S 17/50 |

OTHER PUBLICATIONS

Park, Minwoo; International Preliminary Report on Patentability for PCT Application No. PCT/US2020/062091, filed Nov. 20, 2020, dated Jun. 23, 2022, 9 pgs.

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

"Taxonomy and Definitions for Terms Related to Driving Automation Systems for On-Road Motor Vehicles", Society of Automotive Engineers (SAE), Standard No. J3016-201609, p. 30 (Sep. 30, 2016).

"Taxonomy and Definitions for Terms Related to Driving Automation Systems for On-Road Motor Vehicles", Society of Automotive Engineers (SAE), Standard No. J3016-201806, p. 35 (Jun. 15, 2018).

Park, Minwoo; Notice of Allowance for U.S. Appl. No. 17/103,680, filed Nov. 24, 2020, dated Jan. 20, 2023, 12 pgs.

International Search Report and Written Opinion received for PCT Patent Application No. PCT/US2020/062091, filed Nov. 24, 2020, dated Mar. 19, 2021, 10 pgs.

* cited by examiner

SURFACE PROFILE ESTIMATION AND BUMP DETECTION FOR AUTONOMOUS MACHINE

CROSS-REFERENCE TO RELATED APPLICATIONS

This application is a Continuation of U.S. patent application Ser. No. 17/103,680, filed Nov. 24, 2020, which claims the benefit of U.S. Provisional Application No. 62/946,689, filed on Dec. 11, 2019. Each of which is hereby incorporated by reference in its entirety.

BACKGROUND

When navigating an environment, vehicles—such as autonomous vehicles, semi-autonomous vehicles, non-autonomous vehicles, and the like—may encounter perturbations (such as bumps, humps, or other protuberances, or dips, holes, or other cavities) along the surface of movement that, if not accounted for, may result in an uncomfortable experience for passengers and may cause wear and tear on the vehicle itself. For example, if the vehicle does not decelerate or make suspension adjustments prior to traversing a protuberance in the driving surface, excess force(s) may be put on components of the vehicles—such as the chassis, suspension, axles, treads, joints, and/or the like. As a result, early detection of bumps, dips, or other perturbations in the driving surface may help to smooth the ride for the passengers, as well as increase the longevity of the vehicles and their components.

Some conventional approaches to bump detection rely on prior detections of protuberances and correlating these prior detections with location information—e.g., with a map, such as a high-definition (HD) map. However, relying on prior detections presents a number of challenges: a perturbation may be new or otherwise may not have been previously accounted for; the perturbation must be actually detected, meaning that unsafe conditions may be present in unmapped locations; and location information accuracy issues may result in previously detected perturbations being inaccurately identified, resulting in perturbations being accounted for too early or too late.

Other conventional approaches rely on deep neural networks (DNNs) trained to predict occurrences of and locations of bumps in driving surfaces. However, DNNs not only require an immense amount of relevant training data to converge to an acceptable accuracy, but also require proper labeling and ground truth information to do so. In addition, a DNN must heavily rely on the data—e.g., images—that are being processed to determine occurrences and locations of bumps in the environment. As a result, and because perturbations in a driving surface often blend into the driving surface or are otherwise difficult to distinguish visually (e.g., speed bumps may be a same or similar color to the surrounding driving surface, the curvature of a perturbation may be difficult to ascertain using a single two-dimensional (2D) image applied to a DNN due to a lack of context or contrast, etc.), training a DNN to accurately and continually predict occurrences and locations of perturbations—in addition to the geometry and orientation thereof—is a difficult task. For example, because the geometry and the orientation of a perturbation may be difficult to predict using an image-based DNN, determinations of the necessary adjustments (e.g., slowing down, loosening suspension, etc.) to the vehicle to account for the perturbation may prove challenging, resulting in similar issues to those bump detection is tasked to mitigate—e.g., an uncomfortable experience for passengers and damage to the vehicle and its components.

SUMMARY

Embodiments of the present disclosure relate to surface profile estimation and bump detection for autonomous machine applications. Systems and methods are disclosed that analyze a three-dimensional (3D) point cloud to determine a surface profile, as well as to determine an occurrence, location, orientation, and/or geometry of perturbations along the surface within the environment. For example, by accurately identifying, locating, and determining a geometry of bumps, humps, dips, holes, and/or other perturbations of a surface, a vehicle—such as an autonomous or semi-autonomous vehicle (e.g., employing one or more advanced driver assistance systems (ADAS)—may account for the perturbations by slowing down and/or adjusting parameters of the suspension. In addition, using a determined surface profile, the vehicle may more safely and cautiously navigate through the environment by accounting for gaps in visual completeness—e.g., where a road curves sharply from an incline to a decline creating a blind region beyond the apex, a determination may be made to slow the vehicle down until the visual surface beyond the apex becomes visible.

In contrast to conventional systems, such as those described above, the systems and methods of the present disclosure generate a 3D point cloud using sensor data from one or more sensors of a vehicle. For example, sequences of images from an image sensor—e.g., of a monocular camera—may be analyzed using structure from motion (SfM) techniques to generate the 3D point cloud. The 3D point cloud may be used to determine—within a threshold height from the driving surface—a surface profile. In some embodiments, to increase accuracy and reduce compute costs, at least some of the points in the 3D point cloud may be filtered out or ignored using supplemental data—such as a lane profile corresponding to the driving surface, an estimated location of a ground plane corresponding to the driving surface, and/or drivable free-space information. Once the remaining points in the 3D point cloud are determined, a sliding window of bounding shapes may be iterated at increments along a longitudinal direction—or other direction of the surface profile, such as determined using a lane profile or road curvature information—to generate one-dimensional (1D) signals corresponding to the surface profile. As such, these 1D signals may be used to determine a profile for the driving surface and/or to identify bumps, humps, or other perturbations. For example, local maxima along the 1D signals may be identified and compared to a threshold height value to determine occurrences of perturbations, and the 3D point cloud, the 1D signal, and/or other generated information may be used to determine a location, orientation, and/or geometry of the perturbation for use by the vehicle in performing one or more operations.

As a result of using a 3D point cloud—generated using SfM, in embodiments—the geometry and the orientation of perturbations on the driving surface may be more accurately predicted because multiple images with varying perspectives of the perturbation may be analyzed to factor into the calculation. As such, in contrast to conventional approaches that rely on single image based DNNs, more contrast and context may be determined—leading to more effective detection of and accounting for bumps, humps, dips, holes, and other perturbations on the driving surface. In addition, because the process is suitable for real-time or near real-time deployment, the requirement of prior detections and mapping of some conventional systems is avoided, thereby allowing the vehicle to travel in previously unmapped locations while still accounting for the surface profile.

BRIEF DESCRIPTION OF THE DRAWINGS

The present systems and methods for surface profile estimation and bump detection for autonomous machine applications are described in detail below with reference to the attached drawing figures, wherein.

DETAILED DESCRIPTION

Systems and methods are disclosed related to surface profile estimation and surface perturbation detection for autonomous machine applications. Although the present disclosure may be described with respect to an example autonomous vehicle 600 (alternatively referred to herein as "vehicle 600", "ego-vehicle 600", or "ego vehicle 600," an example of which is described with respect to FIGS. 6A-6D, this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving or ADAS systems, this is not intended to be limiting. For example, the systems and methods described herein may be used in simulation environment (e.g., to test steering, acceleration/deceleration, suspension adjustments, or other operations in a simulated world), in piloted or un-piloted robotics and robotics platforms, aerial systems, boating systems, and/or other technology areas, such as for perception, world model management, path planning, obstacle avoidance, and/or other processes.

Figure 1:
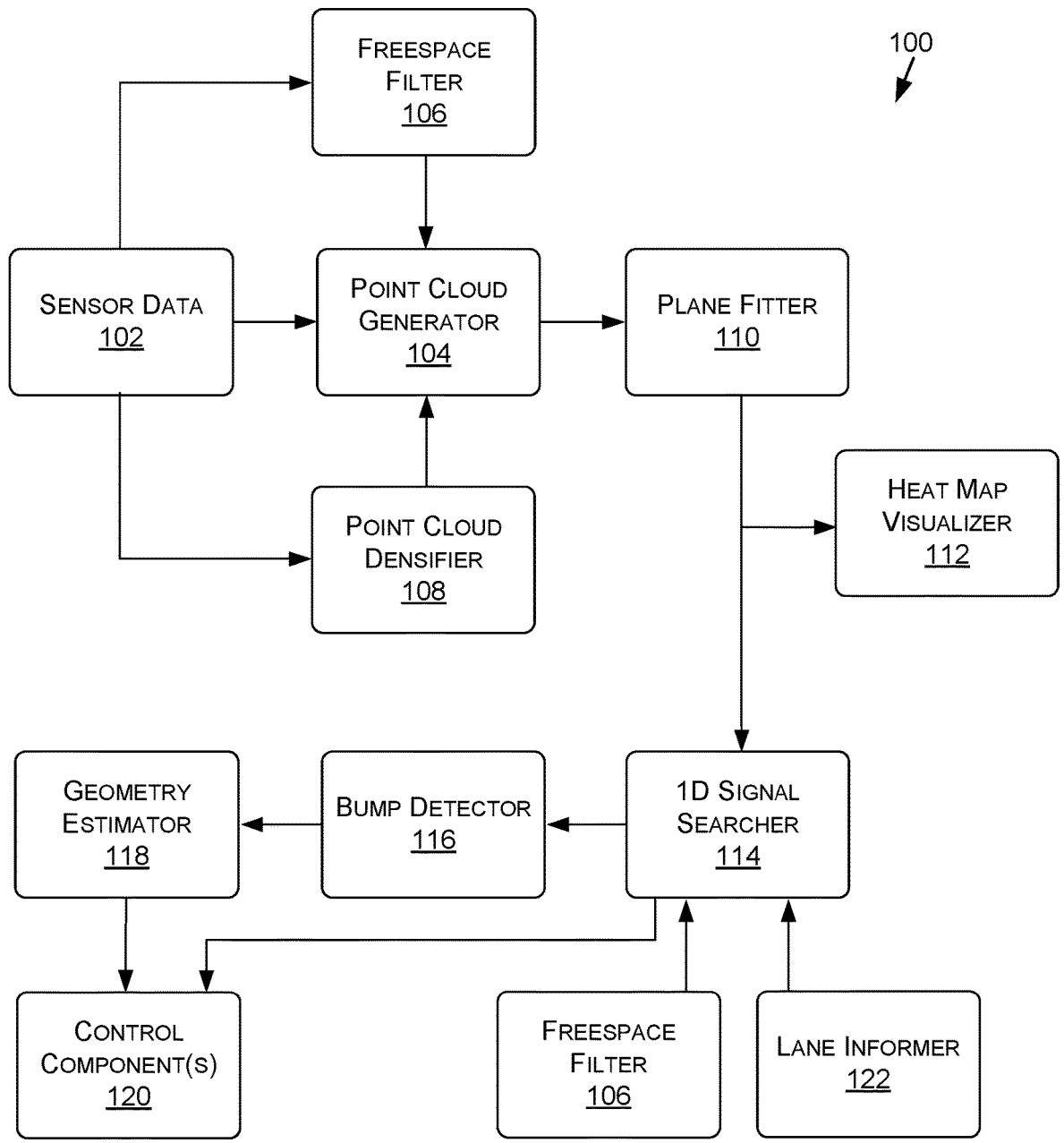
FIG. 1 is a data flow diagram for a process of surface profile estimation and surface perturbation detection, in accordance with some embodiments of the present disclosure.

Now with reference to FIG. 1, FIG. 1 is a data flow diagram for a process 100 of surface profile estimation and surface perturbation detection, in accordance with some embodiments of the present disclosure. For example and illustrative purposes, FIG. 1 may be described herein with respect to FIGS. 2 and 3A-3D; however, this is not intended to be limiting. The process 100 may be implemented using, as a non-limiting embodiment, an autonomous vehicle—such as the autonomous vehicle 600 described herein. In some embodiments, some or all of the process 100 may be implemented using a computing device(s) and/or components thereof that may be similar to those of an example computing device 700, described herein. For example, and without limitation, free-space filter 106, point cloud generator 104, point cloud densifier 108, and/or other components or modules within the process 100 may be executed using one or more components, features, or functionalities described herein with respect to the autonomous vehicle 600 and/or the example computing device 700. In some embodiments, and without departing from the scope of the present disclosure, to execute the process 100, additional and/or alternative components, features, and/or functionalities may be used other than those described herein with respect to the autonomous vehicle 600 and/or the example computing device 700.

The process 100 may include generating and/or receiving sensor data 102 from one or more sensors—e.g., sensors of the vehicle 600. The sensor data 102 may be used by the vehicle 600, or another system, for generating a point cloud that may be used to predict a surface profile—such as a road surface profile including one or more perturbations—and/or to predict locations, geometries, and/or orientations of the perturbations. In some embodiments, the sensor data 102 may include, without limitation, sensor data 102 from any of the sensors of the vehicle 600 (and/or other vehicles, machines, or objects, such as robotic devices, water vessels, aircraft, trains, construction equipment, VR systems, AR systems, etc., in some examples). For a non-limiting example, such as where the sensor(s) generating the sensor data 102 are disposed on or otherwise associated with a vehicle, the sensor data 102 may include the data generated by, without limitation, global navigation satellite systems (GNSS) sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera (s) 674 (e.g., 360 degree cameras), long-range and/or mid-range camera(s) 698, speed sensor(s) 644 (e.g., for measuring the speed of the vehicle 600), and/or other sensor types. Although reference is primarily made herein to the sensor data 102 corresponding to image data and/or other sensor data used for structure from motion (SfM) calculations, this is not intended to be limiting, and the sensor data 102 may alternatively or additionally be generated by any of the sensors of the vehicle 600, another vehicle, and/or another system (e.g., a virtual vehicle in a simulated environment, a robotics system, a drone system, etc.).

In some examples, the sensor data 102 may include the sensor data generated by one or more forward-facing sensors, side-view sensors, and/or rear-view sensors. This sensor data 102 may be useful for determining a surface profile and/or for identifying, detecting, classifying, and/or determining a geometry and/or orientation of perturbations (e.g., bumps, humps, dips, holes, debris, etc.) along the surface. In embodiments, any number of sensors may be used to incorporate multiple fields of view (e.g., the fields of view of the long-range cameras 698, the forward-facing stereo camera 668, and/or the forward facing wide-view camera 670 of FIG. 6B) and/or sensory fields (e.g., of a LIDAR sensor 664, a RADAR sensor 660, etc.). However, in some non-limiting embodiments, the sensor data 102 may be captured by a single monocular camera as a sequence of images over time. For example, as the vehicle 600 travels along a driving surface, the single monocular camera may capture a sequence of images that may be represented by the sensor data 102, and the sequence of images may be used by a point cloud generator 104 (e.g., using a SfM algorithm) to generate a point cloud.

In some embodiments, the sensor data 102 may also be used by a free-space filter 106 to filter out portions of the sensor data 102 and/or point clouds generated therefrom. The free-space filter 106 may include a computer vision algorithm, an object detection algorithm, and/or a deep neural network (DNN). For example, in some non-limiting embodiments, the free-space filter 106 may use systems, methods, features, and/or functionality similar to that described in U.S. patent application Ser. No. 16/355,328, filed on Mar. 15, 2019, and hereby incorporated by reference in its entirety. The free-space filter 106 may be used to filter out portions of images that correspond to non-drivable or non-traversable space within an environment represented by the images and/or to filter out portions or subsets of points from a point cloud that correspond to the non-drivable or non-traversable space. As an example, and with respect to the vehicle 600, the free-space filter 106 may filter out or otherwise cause the system to ignore portions of the environment that are non-drivable or non-traversable by the vehicle 600. For example, sidewalks, buildings, other vehicles, pedestrians, bicyclists, animals, trees, and/or other portions of an environment may be filtered out or ignored by the system using the free-space filter 106, and the driving surface—e.g., the road, a lane, a parking lot, a driveway, etc.—may remain for further analysis of a driving surface profile and/or protuberances on the driving surface.

Figure 2:
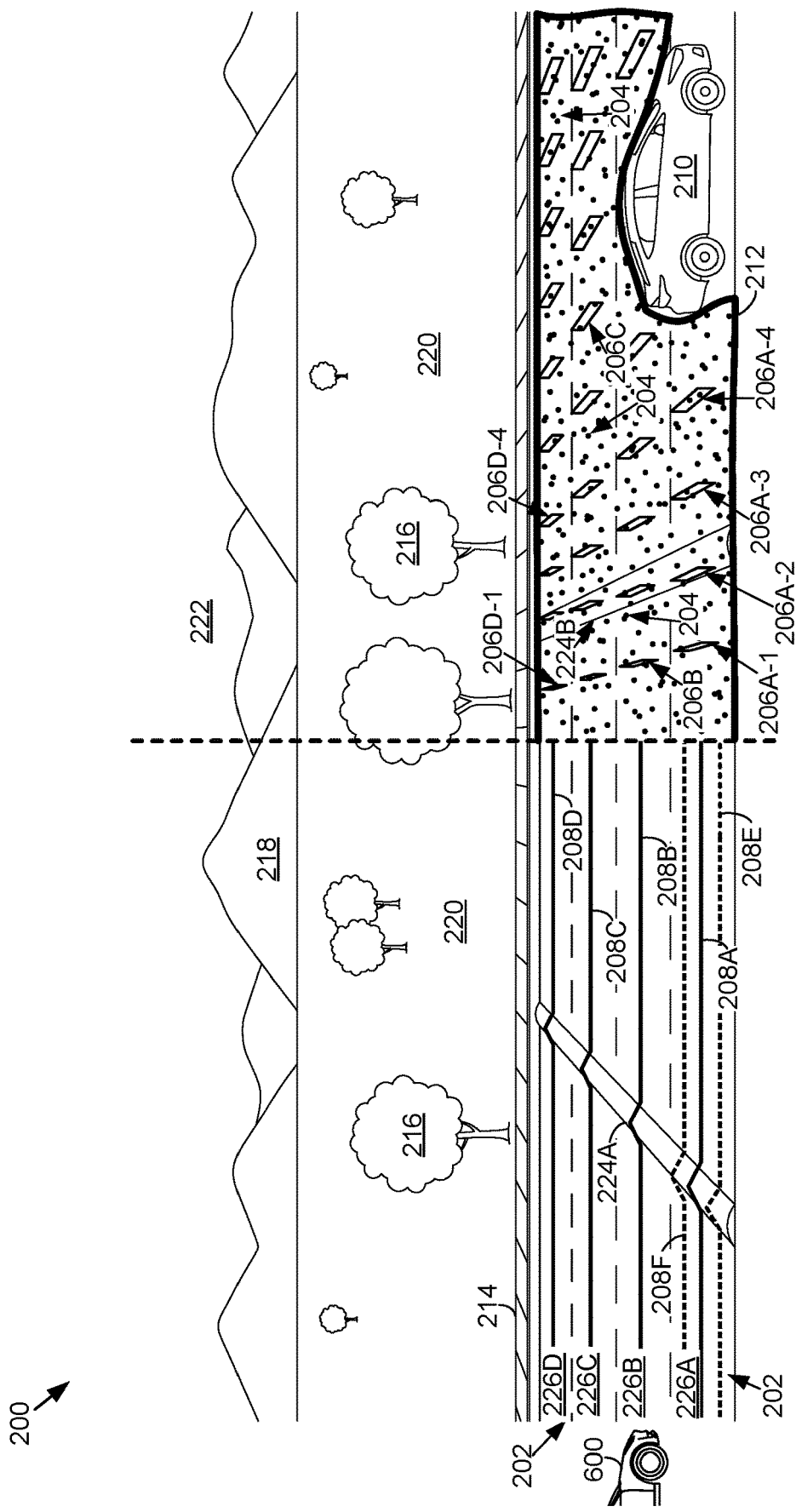
FIG. 2 is an example visualization of using a three-dimensional (3D) point cloud for estimating a surface profile and detecting surface perturbations, in accordance with some embodiments of the present disclosure.

As an example, and with respect to visualization 200 of FIG. 2, the vehicle 600 may use one or more sensors—such as a single monocular forward-facing camera—to capture images of the environment as the vehicle 600 traverses a driving surface 202. The images may be used—in addition to other sensor data 102, in embodiments—to filter out portions of the images and/or a point cloud 204 that do not correspond to the driving surface 202. The free-space filter 106 may compute a location of a free-space boundary 212 with respect to each of the images (e.g., in two-dimensional (2D) image space) and/or the environment represented therein (e.g., in 3D world space). For example, the free-space boundary 212 as represented in the visualization 200 may extend along the driving surface 202 and divide the driving surface 202 from a sidewalk 214, a vehicle 210, trees 216, mountains 218, open areas 220, the sky 222, etc. The free-space boundary 212 may then be used to filter out pixels of the images outside of the free-space boundary 212 in image space (which may then tailor or focus the point cloud 204 generation only on the portions of the images within the free-space boundary 212) and/or to filter out points from the point cloud 204 outside of the free-space boundary 212 in world space and/or in relative 2D image space (e.g., the 3D point cloud locations may be translated relative to 2D image space). In either example, the free-space filter 106 may ultimately be used to generate the point cloud 204 only within the drivable free-space for the vehicle 600.

Referring again to FIG. 1, a point cloud generator 104 may generate a point cloud—e.g., a 3D point cloud—to represent locations of objects in space. The point cloud generator 104 may use a SfM algorithm to generate the point cloud from the sensor data 102, in embodiments. However, this is not intended to be limiting, and in other embodiments the point cloud may be generated from LIDAR sensors, RADAR sensors, ultrasound sensors, and/or other sensors or combinations thereof using other point cloud generation algorithms.

In embodiments where SfM is used, the sensor data 102 may include image data generated by and/or received from one or more image sensors. For example, one or more cameras may be used to capture images of an environment—and particular objects therein—from varying perspectives in order to accurately generate a point cloud using SfM. In some embodiments, this may include multiple cameras with different vantage points or fields of view—such as two or more cameras of the vehicle 600, another vehicle, a robot, another moving object, a stationary object, etc. In at least one embodiment, a single monocular camera may be used—such as the wide view camera 670 of the vehicle 600 as illustrated in FIG. 6B—where the different viewpoints and perspectives may be captured through a sequence of images captured by the camera as the object associated with the camera moves through space. In such embodiments, by using a single camera, compute, bandwidth, and hardware resources may be saved while still producing accurate and reliable results as the movement of the object associated with the single camera provides enough diversity in perspectives of objects to enable accurate SfM calculations. For example, without specialized equipment—such as stereo cameras—SfM may use a plurality of images from a single camera that depict an area or object with a high degree of overlap to generate a point cloud.

SfM algorithm(s) may be used to generate a 3D point cloud—or structure of a scene—from a series or sequence of 2D images. SfM may use the plurality of images—represented by the sensor data 102—to identify matching features or points across the images. The features may include corners, edges, line segments, points, and/or other distinctive features within the images. For example, features may be identified in each image, or a first image, and then searched for in other images to determine a match. The matched features may be tracked across images within the series or sequence to produce estimates of camera positions, orientations, and the coordinates of the features. For example, the camera position(s) may be computed and/or determined (e.g., from other sensor data 102) along with the 3D point positions such that corresponding viewing rays intersect. The end result is a point cloud where each point represents a 3D coordinate (x, y, z). The 3D point cloud may be represented or generated in a relative 2D image space coordinate system, or may be generated or aligned with a 3D world space coordinate system—e.g., using ground-control points (GCPs) or georeferenced imagery.

For example, and with reference to the visualization 200 of FIG. 2, the vehicle 600 may capture images from one or more cameras as the vehicle 600 moves along the driving surface 202, and the images may be analyzed using SfM to generate the point cloud 204. The point cloud 204 may include points corresponding to the driving surface 202 and/or one or more bumps 224 (e.g., bumps 224A and 224B, which may be speed bumps, undulations, imperfections in the road, etc.) thereon. Although not illustrated in FIG. 2, the point cloud 204 may extend to the rest of the environment—e.g., to the vehicle 210, the sidewalk 214, etc. —in embodiments where the images used to generate the point cloud 204 and/or the point cloud 204 itself are not filtered using the free-space filter 106. In other embodiments, as described herein, the point cloud 204 may be generated using another technique, such as using a point cloud generated from a LIDAR sensor(s).

Figure 3A:
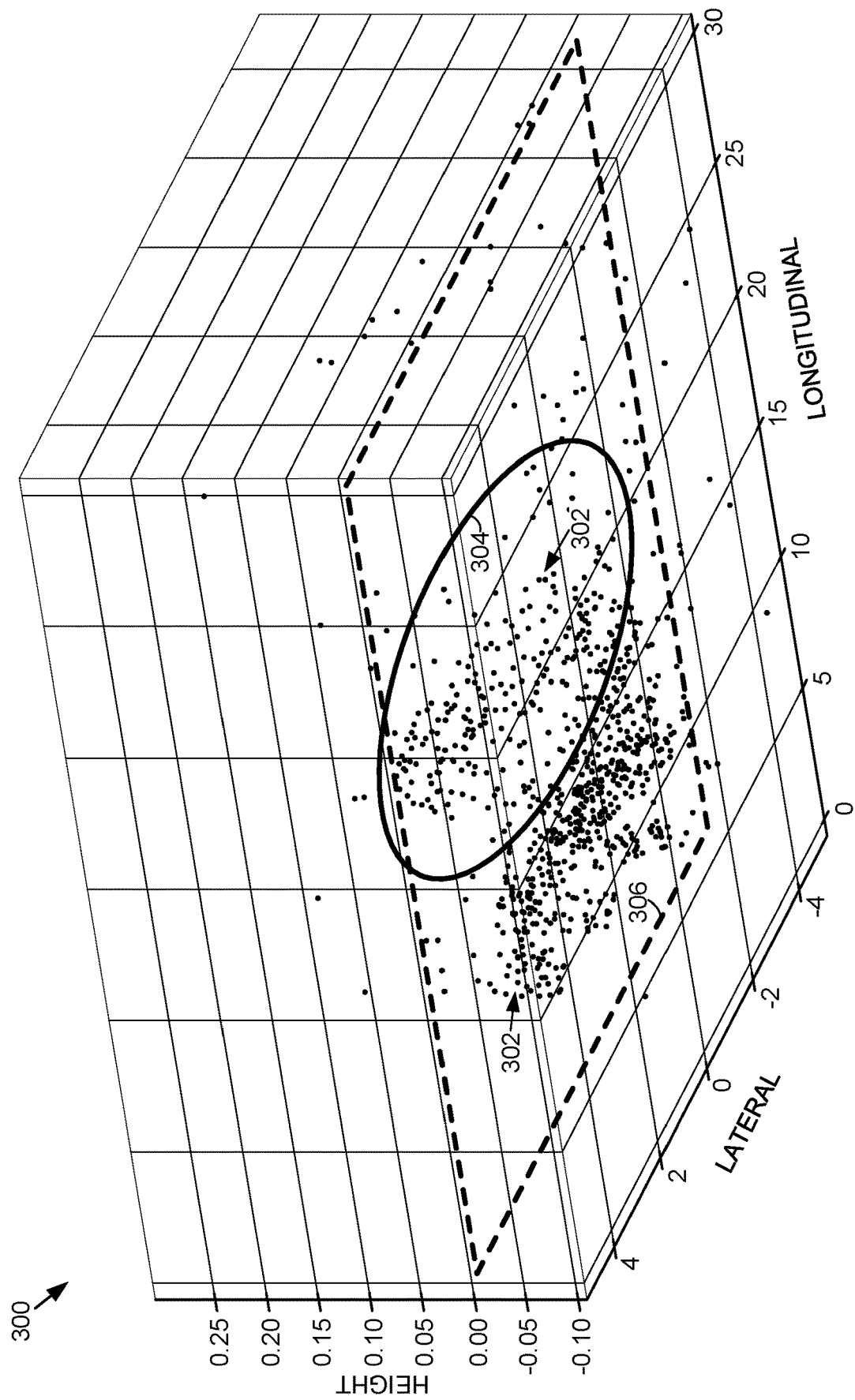
FIG. 3A is an example illustration of a 3D point cloud and a ground plane estimation therefrom, in accordance with some embodiments of the present disclosure.
Figure 3B:
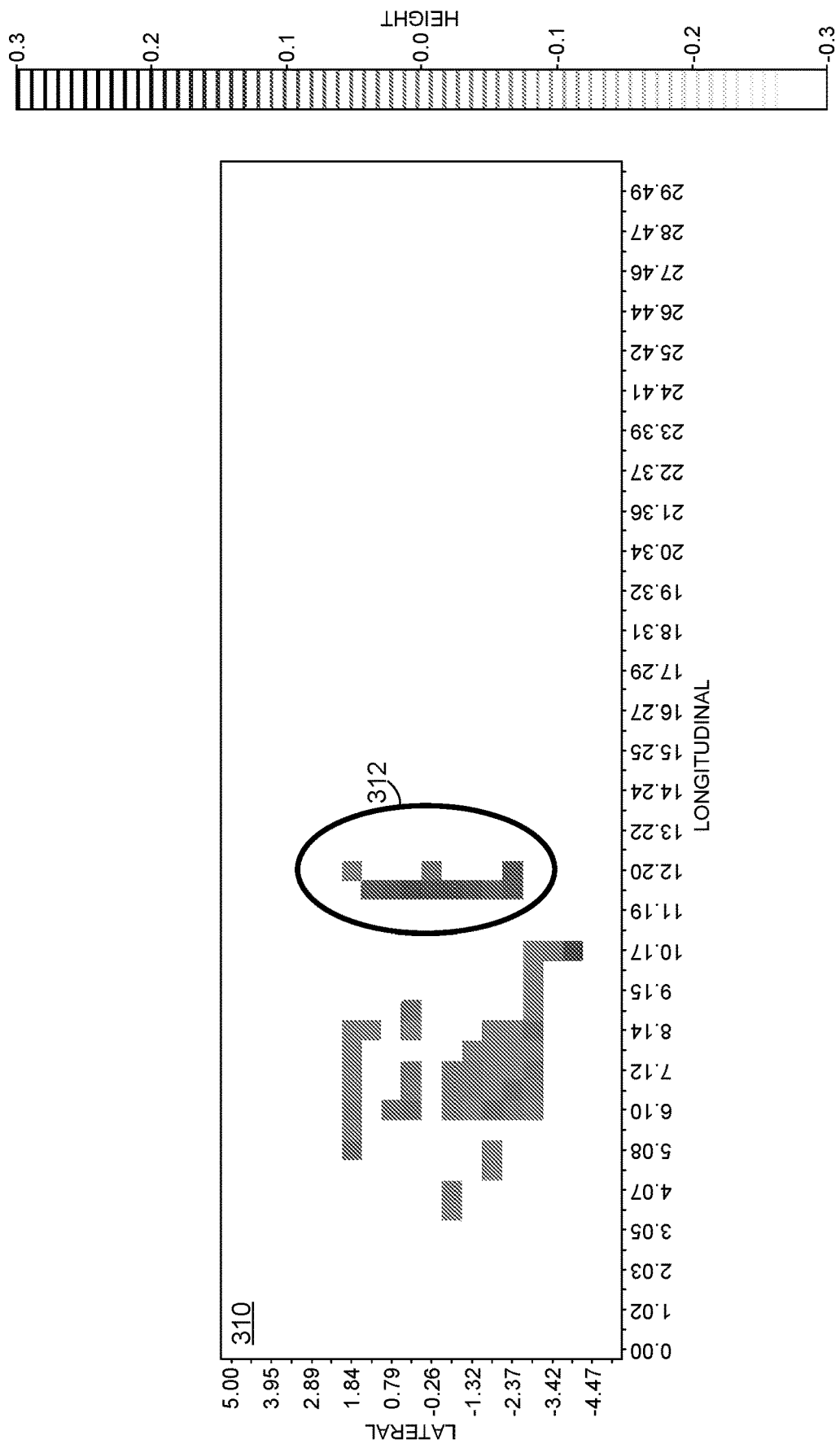
FIG. 3B is an example illustration of a heat map corresponding to heights determined from a 3D point cloud, in accordance with some embodiments of the present disclosure.

As another example, and with reference to FIG. 3A, graph 300 represents a point cloud 302 in 3D space. Where the graph 300 references images of a driving surface—such as the driving surface 202 of FIG. 2—the points in the point cloud 302 may correspond to the driving surface and protuberances thereon (and/or vehicles, pedestrians, or other objects and features in the environment). Encircled region 304 may correspond to a location within the point cloud 302 where the height of the 3D points is indicative of a protuberance (e.g., with respect to an estimated ground plane 306).

Referring again to FIG. 1, a point cloud densifier 108 may perform densification on the point cloud generated by the point cloud generator 104. For example, because the point cloud may include sparse points, the point cloud densifier 108 may use a densification function to increase the density of the sparse point cloud generated by the point cloud generator 104. For a non-limiting example, least square template matching (LSTM) may be used by the point cloud densifier 108 for the densification process. The point cloud densifier 108 may receive or use the sensor data 102 as input to perform densification, and the output may be used by the point cloud generator 104 to generate the point cloud.

A plane fitter 110 may determine an estimated plane—e.g., a ground plane—using the 3D point cloud. For example, when identifying protuberances on a surface, having a ground plane to use as a reference plane may be helpful in such identification. For example, for a vehicle—such as the vehicle 600—traveling along a road or other driving surface, estimating a ground plane corresponding to the plane of the driving surface may be helpful as a reference (e.g., a z direction or height origin (e.g., (x, y, 0)) for determining heights of point cloud points relative to the ground plane. In such an example, where the point cloud points are above a threshold value—and below a threshold value, in embodiments—the point cloud points may be determined to correspond to a protuberance along the driving surface. In some examples, the plane fitter 110 may use one or more functions to determine a plane location and orientation using the point cloud data. For example, random sample consensus (RANSAC) may be used to determine the plane. As an example, and again with reference to FIG. 3A, the point cloud 302 may be analyzed to compute or determine the ground plane 306 in 2D image space and/or 3D world space.

In some non-limiting embodiments, in addition to or alternatively from generating the ground plane, a surface—e.g., a driving surface—may be determined. For example, the plane determined by the plane fitter 110 may serve as the driving surface in some embodiments. In other embodiments, motion of the object—such as the vehicle 600—may be tracked using the sensor data 102 (e.g., from speed sensors 644, IMU sensor(s) 666, etc.) and the location of the surface relative to the object may be determined from this data. In such examples, the height or other dimensions that are later computed for the surface profile may be computed relative to the driving surface. In some embodiments, a map—such as a GPS map, an HD map, etc. —may be used to determine a location of a surface for the object. For example, in an HD map, a surface location may be known, so this information may be used—after localization of the object in the map—to compute the surface profile. In any example, the plane, motion of the object, the map, and/or another source of information about the surface may be used for determining where to locate bounding shapes (e.g., determining a location of a bottom edge of the bounding shapes along the surface), for determining a surface location to calculate heights relative to, and/or for other purposes with respect to the profile generation.

A heat map visualizer 112 may be used to generate a visualization of the point cloud with respect to a reference. For example, the reference may be the plane determined using the plane fitter 110, or may be another reference—such as an object, an area, etc. As an example, and with respect to FIGS. 3A-3B, a heat map 310 may be generated using the point cloud in view of a height of the points with respect to a plane—such as the ground plane 306. For example, if the heat map 310 were overlaid onto the driving surface 202 of FIG. 2, regions 312A and 312B may correspond to the bumps 224A and 224B, respectively. In such an example, the ground plane 306 may correspond to the driving surface outside of the regions of the driving surface 202 that correspond to the bumps 224A and 224B. In an example, the heat map 310 may provide a visualization of the point cloud to help in understanding or visualizing a desired feature or aspect with respect to the point cloud—in this example, locations of protuberances.

A 1D signal searcher 114 may compute or determine a 1D signal using the point cloud. In some embodiments, the 1D signal may represent a height—e.g., along a z-direction—of points in the point cloud that correspond to a surface. For example, the 1D signal may represent a surface profile of a surface, which may include surface protuberances and/or cavities. To generate the 1D signal, in embodiments, a sliding window(s) of bounding shapes (e.g., boxes, squares, circles, rectangles, triangles, spheres, cubes, ovals, polygons, etc.) may be applied to the point cloud—e.g., the entire point cloud or a point cloud that has been filtered or truncated using the free-space filter 106. With reference to the surface, the sliding window of bounding shapes may be applied along a direction of travel of an object, a heading of an object, and/or along a longitudinal directional component as determined by a road profile—such as a lane profile. Where a road profile or lane profile is used, a lane informer 122 may generate and/or provide the profile to the 1D signal searcher 114 to determine the locations of the bounding shapes within the sliding window along the point cloud. For example, the lane informer 122 may reference a GNSS system, a GPS system, a high-definition (HD) map, and/or another source to determine a location, number, and/or geometry of the lanes or other discrete portions of the surface. In any embodiment, once the location and directionality of the sliding window(s) of bounding shapes is determined, the sliding window(s) may be applied to the point cloud to generate the 1D surface profile.

Along a lateral direction—e.g., from left to right along a driving surface—a plurality of sliding windows may be spaced at intervals (e.g., every ten centimeters (cm), every twenty cm, every fifty cm, etc.), and along each sliding window, the bounding shapes may be spaced at intervals (e.g., every five cm, every twenty cm, every fifty cm, etc.). In some embodiments, the bounding shapes of adjacent sliding windows may overlap, while in other embodiments the bounding shapes may not overlap. With reference to a lane or other discrete portion of a driving surface, one or more sliding windows may be applied within each lane or other discrete portion. For a non-limiting example, if the sliding windows are spaced by fifty cm from a centroid or respective bounding shapes, then a two meter lane may include four sliding windows. In a similar example, if the sliding windows are spaced by two meters with respect to a centroid of a respective bounding shape, then the same lane may include only a single bounding shape. In some examples, the sliding windows may only be applied within drivable free-space—which may be a result of the point cloud already being filtered or truncated using the free-space filter 106 or may be a result of the free-space filter 106 being used to inform the placement of the sliding windows along the point cloud.

Dimensions of the bounding shapes, spacing of the bounding shapes within sliding windows, and spacing of the sliding windows may be customizable parameters of the 1D signal searcher 114. For example, the width, height, and/or depth of the bounding shapes may be tuned depending on the objects or features of the environment that the 1D signal searcher 114 is being used for. In an example where a surface profile—such as a road surface profile—is being determined, the bounding shapes may have a height that is around a maximum determined height of protuberance types (e.g., speed bumps, undulations, humps caused from tree roots, etc.). In one or more embodiments the height may be an absolute height to account for other surface perturbation types such as dips, holes, and the like. As a result, the points in the point cloud above the threshold height may not be factored in, thereby removing other objects such as vehicles, animals, persons, etc. from being included in the 1D profile. Similarly, a width of the bounding shapes may be tuned to account for variations across a surface. For example, where a surface has more constant variations, the width of the bounding shapes along a lateral direction may be smaller, and the number and spacing of sliding windows may be increased (e.g., to three to six sliding window instances per lane). As another example, where a surface has less constant variation (e.g., a cement roadway), the width of the bounding shapes may be greater, and the number and spacing of sliding windows may be decreased (e.g., to one to three sliding window instances per lane). Similar determination may be made for indoor environments (e.g., hallways, open spaces, etc.) or off-road environments (e.g., sidewalks, grass/dirt areas, etc.).

As an example, and again with reference to FIG. 2, sliding windows of bounding shapes 206 may be applied to the point cloud 204 along the driving surface 202. The orientation of the sliding windows (e.g., a first sliding window may include bounding shapes 206A-1 through 206A-N, where N is the number of bounding shapes for a given sliding window, a second sliding window may include bounding shapes 206B-1 through 206B-N, and so on) may be relative to a heading or direction of travel of the vehicle 600 and/or may be relative to a road profile of the driving surface 202—such as a known profile (e.g., geometry, location, etc.) of lanes 226 (e.g., lanes 226A-226D in the visualization of FIG. 2). For example, as illustrated in FIG. 2, the sliding windows of bounding shapes may extend along each lane. Although only one sliding window of bounding shapes is illustrated with respect to each lane 226, this is not intended to be limiting, and as described herein any number of sliding windows may be associated with each lane (or other discrete portion of a surface or environment).

The points of the point cloud that are within each bounding shape along each sliding window may be analyzed to determine a value(s) with respect to the bounding shape. In some examples, the value may be a height value, although this is not intended to be limiting. The points within each bounding shape may be analyzed in view of the value(s) to be obtained. Analysis may include applying a clustering algorithm to the points. For example, RANSAC clustering algorithm may be used to determine a value(s) within each bounding shape. Where a height value is the value to be determined, analysis (average, mean, maximum, etc.) of the heights with respect to the points within the bounding shape may be performed to arrive at a value(s) to be used for the 1D signal with respect to the bounding shape. Once a value(s) is determined for each bounding shape along a sliding window, the values corresponding to each bounding shape may be used—e.g., combined—to form a 1D profile. As described herein, the 1D profile may represent a height profile along a surface—such as a driving surface. In some examples, the 1D value for each bounding shape may be represented as a point, and the points of each bounding shape may collectively form poly-points that may be connected to form a polyline that represents the 1D profile. As such, in some embodiments the connections between the poly-points may be a straight line connection, while in other embodiments curve fitting algorithms may be used to form the polyline connections between points that may be linear or curved.

Referring again to FIG. 2, the result of the computations with respect to each of the bounding shapes 206 in a sliding window may be a surface profile 208 (e.g., surface profiles 208A-208D) corresponding to a height profile of the driving surface 202—with respect to a ground plane, in embodiments. As such, as illustrated in FIG. 2, a single sliding window of bounding shapes 206 may be associated with each lane 226 and as a result, a single surface profile 208 may be generated for each lane. However, this is not intended to be limiting, and surface profiles 208E and 208F illustrate additional surface profiles 208 that may be generated for a single lane 226A. In such an example, each surface profile 208E and 208F may also include a respective sliding window of bounding shapes (not illustrated) to generate the surface profiles 208.

Referring again to FIG. 1, a bump detector 116 may be used to detect bumps, dips—or other protuberances or cavities—along the 1D surface profiles. For example, changes in shape or contour of the 1D profile may be compared to bump profiles and/or heights of regions may be compared to threshold heights to determine whether a bump (or other road surface perturbation) is present. With respect to FIG. 3D, a bump profile along a bump region of a 1D surface profile is represented by a histogram. Each increment along the histogram may represent a determined height value corresponding to a bounding shape within a sliding window of bounding shapes—e.g., the histogram includes ten increments which may relate to values from ten bounding shapes. In some examples, once a bump region is detected, and similar to the description of the surface profile generation above, the bump profile may be generated using a curve fitting algorithm or another algorithm for creating a smoother curve that is more likely to represent an actual protuberance. In some examples, a local maxima (or minima) within the bump region may be used to generate the bump profile, such that the local maxima (or minima) may define an absolute peak/trough or apex/nadir of the bump profile.

Figure 3C:
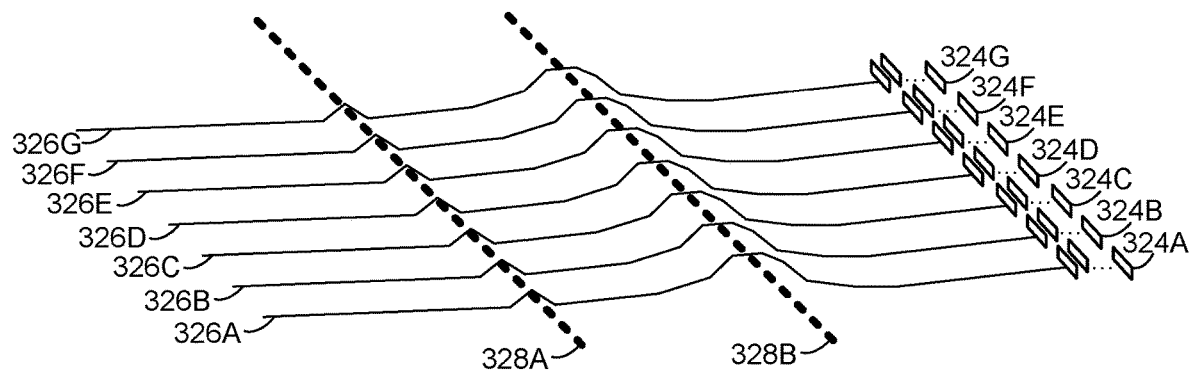
FIG. 3C is an example illustration of a one-dimensional (1D) surface profile, in accordance with some embodiments of the present disclosure.
Figure 3D:
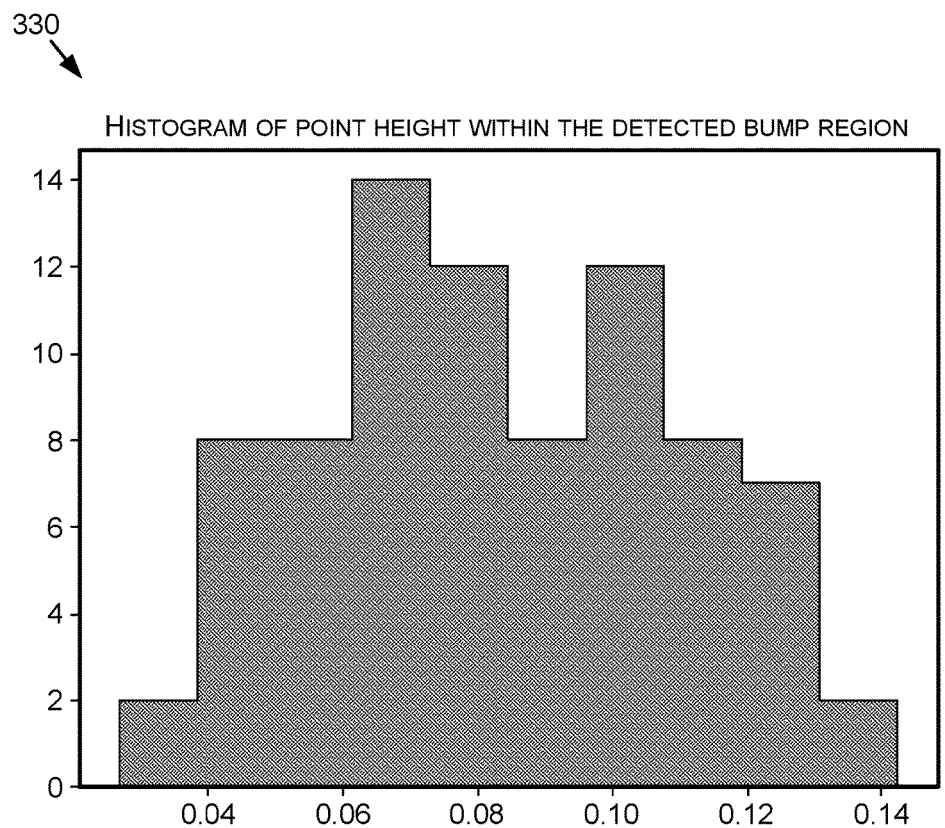
FIG. 3D is an example histogram of point heights within a detected region, in accordance with some embodiments of the present disclosure.

As an example, and with respect to FIG. 3C, sliding windows of bounding shapes 324 (e.g., sliding windows 324A-324G) may be used to generate surface profiles 326 (e.g., 326A-326G) corresponding to a surface—such as a driving surface. The surface profiles individually and in combination may include bump regions 328 (e.g., bump regions 328A-328B) indicating some sort of protuberances in the driving surface.

With reference again to FIG. 1, a geometry estimator may be used to estimate a geometry of bumps, dips, or other protuberances and road surface perturbations along a surface. For example, as described above with respect to the bump detector 116 and/or the 1D signal searcher 114, polylines may be generated linearly and/or using a curve fitting algorithm to define the bump profile along a longitudinal direction. Once the bump profiles are determined for each individual 1D signal, two or more 1D signals may be used in combination to determine an orientation, length, and/or other geometric features of the bump. For example, with reference again to FIG. 3C, the bump regions 328A and 328B for each of the surface profiles 326 may be analyzed to determine whether they relate to similar or different bumps. In the example of FIG. 3C, it may be determined that the bump region 328A for each surface profile 326A-326G relate to a same bump, and similarly for the bump region 328B. As such, because the lateral and longitudinal locations of the surface profiles 326 are known (e.g., from the SfM calculation and/or parameters of the sensors used to generate the sensor data 102), an orientation and location of the bump defined by the bump regions 328A and 328B may be determined. In the illustration of FIG. 3C, the dashed lines along the bump regions 328 may indicate an orientation of the bump or other protuberance relative to a heading of an object—such as the vehicle 600. In addition to the orientation, a geometry may be estimated using the bump profile generated from the point cloud.

The outputs of the geometry estimator 118 and/or the 1D signal searcher 114 may be transmitted, sent, or otherwise provided to control component(s) 120 of an object—such as the vehicle 600, another vehicle, a robot, a simulated vehicle, etc. For example, the surface profile and/or the bump locations, orientations, and/or geometries may be useful for the object to navigate through an environment. With respect to a vehicle—such as the vehicle 600—the surface profile and/or the bump information may be used to update a world model, plan a path along a driving surface, generate control signals for the vehicle for steering, accelerating, braking, adjusting suspension, etc., for actuation controls to execute the controls based on the control signals, for obstacle or collision avoidance, and/or for performing one or more operations with respect to the vehicle. For example, where a surface profile is known, sharp changes in the contour of the driving surface—such as a rolling hill where visibility is low over the apex of the hill—may be determined and the vehicle may slow down as a result to account for any unseen environmental conditions beyond the contour. As another example, where a bump profile, location, orientation, and/or other information is known of a bump, dip, or other surface perturbation, the vehicle may slow down and/or adjust the suspension to cause less of a disturbance to passengers and/or less wear and tear on the vehicle components. With knowledge of the orientation, the vehicle may adjust a heading to traverse the perturbation head on, or at a desired angle, etc. In addition, the orientation may be helpful to determine how much to slow down, what speed to traverse the perturbation, and/or to what degree the suspension should be adjusted.

As an example, and with respect to FIG. 2, the vehicle 600 may receive the surface profiles 208 and/or bump/dip information corresponding to the bump 224A. By understanding the surface profile and the bump profile, the vehicle 600 may determine to decelerate, adjust the suspension, and/or provide a haptic, visual, and/or audible signal within the cabin to indicate that a bump or dip is coming and/or that a surface profile has caused the vehicle to reduce speed. By performing one or more of these operations, the passengers in the vehicle 600 may experience a smoother experience, and may be alerted to the (e.g.,) bump and/or the surface profile so as to prepare for the traversing of the same—e.g., by holding on to or closely monitoring an open liquid container, securing children or animals, etc.

Figure 4:
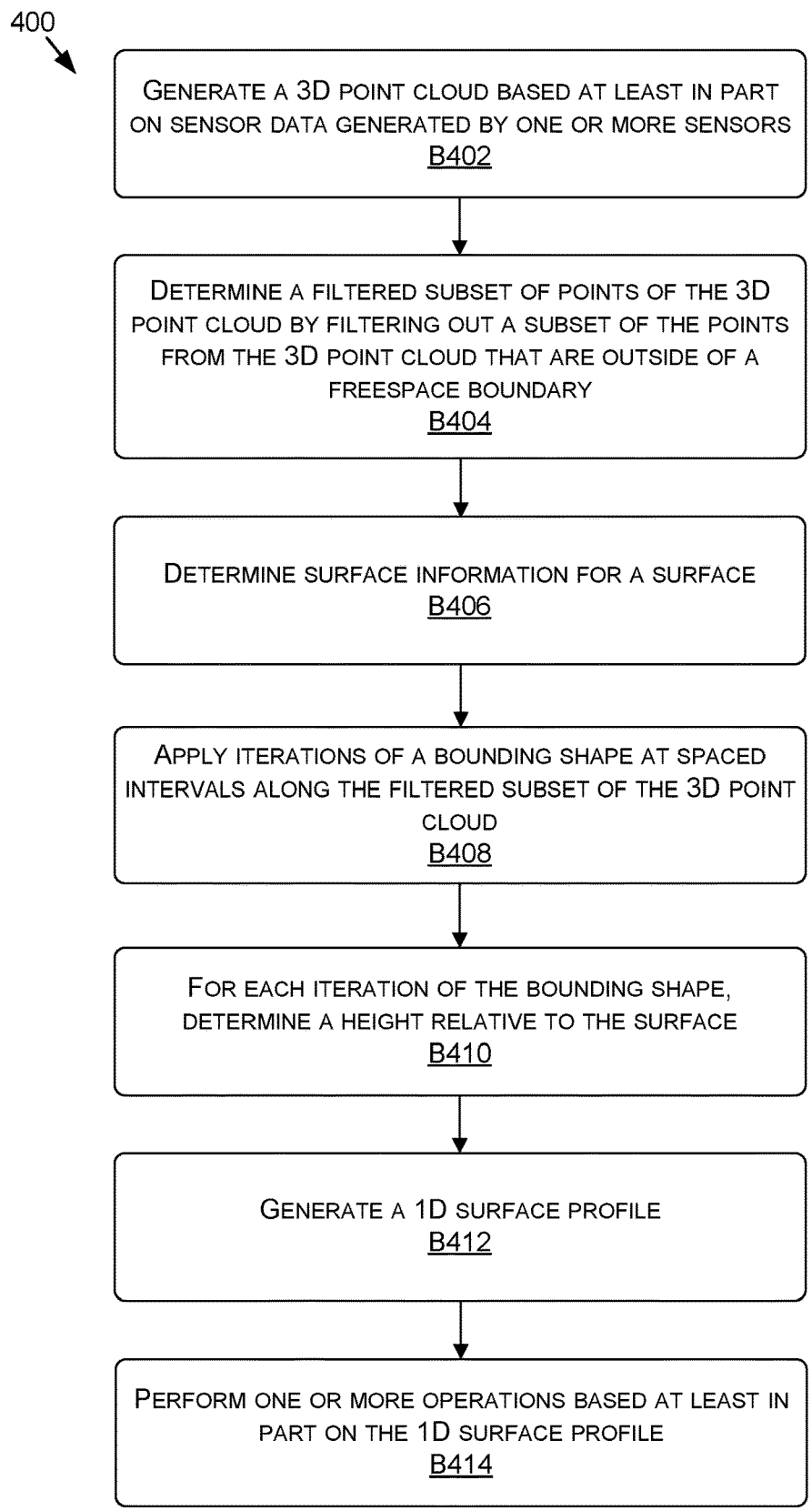
FIGS. 4-5 are flow diagrams showing methods for surface profile estimation and surface perturbation detection, in accordance with some embodiments of the present disclosure.
Figure 5:
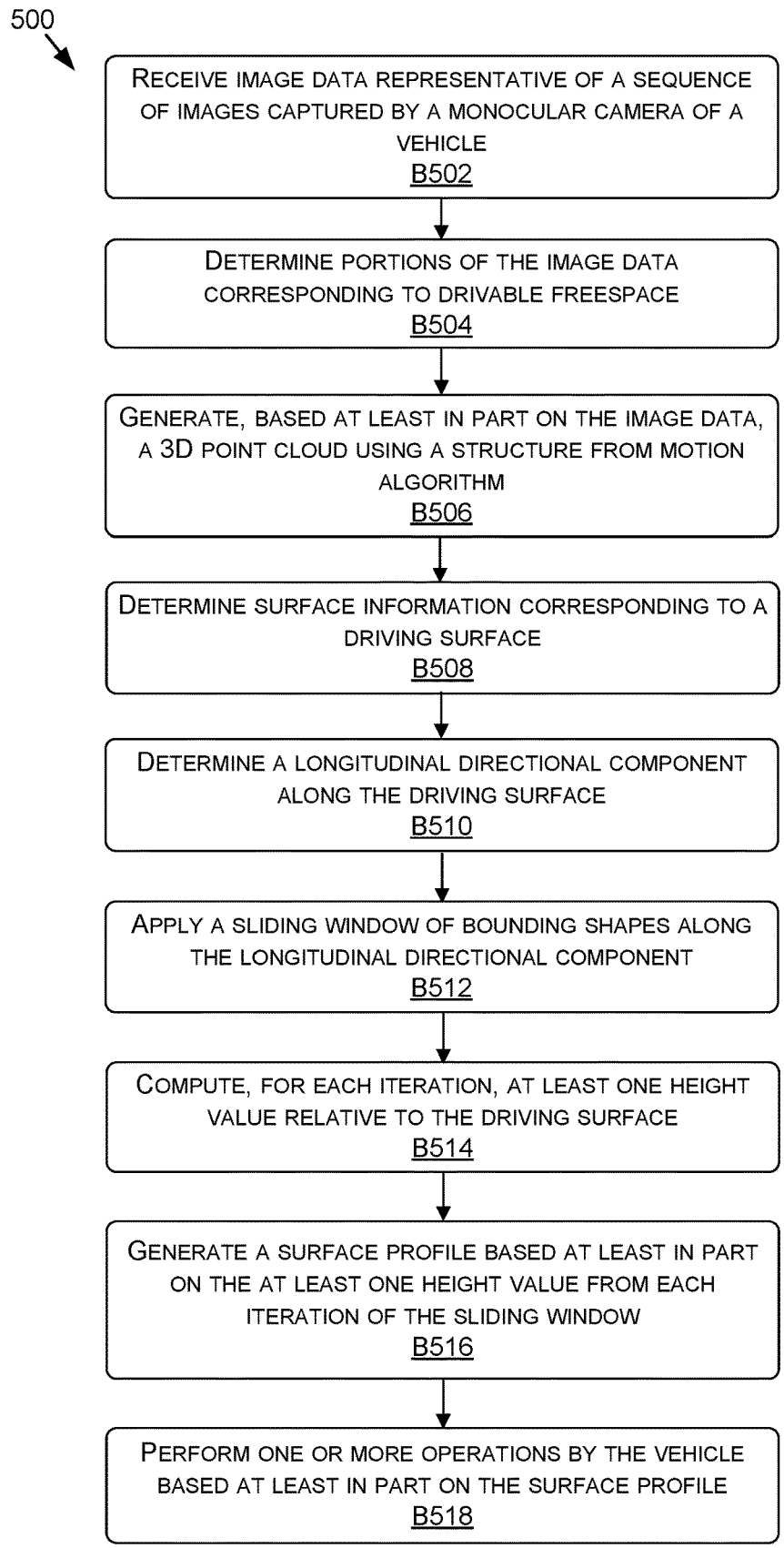

FIGS. 4-5 are flow diagrams showing methods for surface profile estimation and surface perturbation detection, in accordance with some embodiments of the present disclosure.

Now referring to FIGS. 4-5, each block of methods 400 and 500, described herein, comprises a computing process that may be performed using any combination of hardware, firmware, and/or software. For instance, various functions may be carried out by a processor executing instructions stored in memory. The methods 400 and 500 may also be embodied as computer-usable instructions stored on computer storage media. The methods 400 and 500 may be provided by a standalone application, a service or hosted service (standalone or in combination with another hosted service), or a plug-in to another product, to name a few. In addition, method 400 and 500 are described, by way of example, with respect to the process 100 of FIG. 1. However, these methods may additionally or alternatively be executed by any one system, within any one process, or any combination of systems and processes, including, but not limited to, those described herein.

Now referring to FIG. 4, FIG. 4 is a flow diagram showing a method 400 for surface profile estimation and surface perturbation detection, in accordance with some embodiments of the present disclosure. The method 400, at block B402, includes generating a 3D point cloud based at least in part on sensor data generated by one or more sensors. For example, the point cloud generator 104 may generate a 3D point cloud using the sensor data 102.

The method 400, at block B404, includes determining a filtered subset of points of the 3D point cloud by filtering out a subset of the points from the 3D point cloud that are outside of a free-space boundary. For example, a free-space filter may be used to filter out points of the 3D point cloud that are outside of the free-space boundary—either by filtering out the points themselves or by ignoring the portions of the sensor data 102 outside of the free-space boundary when generating the free-space boundary.

The method 400, at block B406, includes determining surface information for a surface. For example, using the plane fitter 110, motion of the object (e.g., motion of the vehicle 600), a map, and/or another method, surface information such as height, location, curvature, etc. of the driving surface may be determined.

The method 400, at block B408, includes applying iterations of a bounding shape at spaced intervals along the filtered subset of the 3D point cloud. For example, the 1D signal searcher 114 may apply sliding windows of bounding shapes along the 3D point cloud, and may use the surface information to determine where to locate the bounding shapes.

The method 400, at block B410, includes, for each iteration of the bounding shape, determine a height relative to the surface. For example, for each bounding box iteration along a sliding window, a height value may be determined relative to a surface—e.g., relative to a plane determined by the plane fitter 110—as determined using the surface information.

The method 400, at block B412, includes generating a 1D surface profile. For example, the (e.g., absolute) heights from the iterations of the bounding shapes along the sliding window may be used to determine a 1D surface profile.

The method 400, at block B414, includes performing one or more operations based at least in part on the 1D surface profile. For example, using the 1D surface profile, locations, orientations, and/or geometries of protuberances may be determined, control decisions may be made, and/or other operations may be performed.

Now referring to FIG. 5, FIG. 5 is a flow diagram showing a method 500 for surface profile estimation and surface perturbation detection, in accordance with some embodiments of the present disclosure. The method 500, at block B502, includes receiving image data representative of a sequence of images captured by a monocular camera of a vehicle. For example, image data—e.g., the sensor data 102—may be captured by a monocular camera of the vehicle—such as a single monocular camera of the vehicle 600.

The method 500, at block B504, includes determining portions of the image data corresponding to drivable free-space. For example, the free-space filter 106 may be used to determine portions of the image data that correspond to drivable free-space and non-drivable space.

The method 500, at block B506, includes generating, based at least in part on the image data, a 3D point cloud using a structure from motion (SfM) algorithm. For example, a SfM algorithm may be used by the point cloud generator 104 to generate a 3D point cloud from the sensor data 102—which may represent a sequence or series of images, in embodiments.

The method 500, at block B508, includes determining driving surface information corresponding to a driving surface. For example, using the plane fitter 110, motion of the object (e.g., motion of the vehicle 600), a map, and/or another method, surface information such as height, location, curvature, etc. of the driving surface may be determined The method 500, at block B510, includes determining a longitudinal directional component along the driving surface. For example, a heading of a vehicle, a direction of a vehicle, and/or a lane profile from a lane informer 122 may be used to determine a directional component along the surface.

The method 500, at block B512, includes applying a sliding window of bounding shapes along the longitudinal directional component. For example, the sliding window of bounding shapes may be applied by the 1D signal searcher along the longitudinal directional component—which may be straight, curved, or a combination thereof depending on the embodiment and the information used for determining the longitudinal directional component.

The method 500, at block B514, includes computing, for each iteration, at least one height value relative to the driving surface. For example, for each bounding shape along a sliding window, a height value(s) may be calculated using the 3D point cloud, where the height may be an absolute height relative to the driving surface as determined using the plane fitter 110, a map, motion of the vehicle 600, and/or another method.

The method 500, at block B516, includes generating a surface profile based at least in part on the at least one height value from each iteration of the sliding window. For example, a surface profile may be generated by the 1D signal searcher.

The method 500, at block B518, includes performing one or more operations by the vehicle based at least in part on the surface profile. For example, using the surface profile, locations, orientations, and/or geometries of protuberances may be determined, control decisions may be made (e.g., slow down, avoid the bump, adjust suspension, etc.), and/or other operations may be performed.

Example Autonomous Vehicle

Figure 6A:
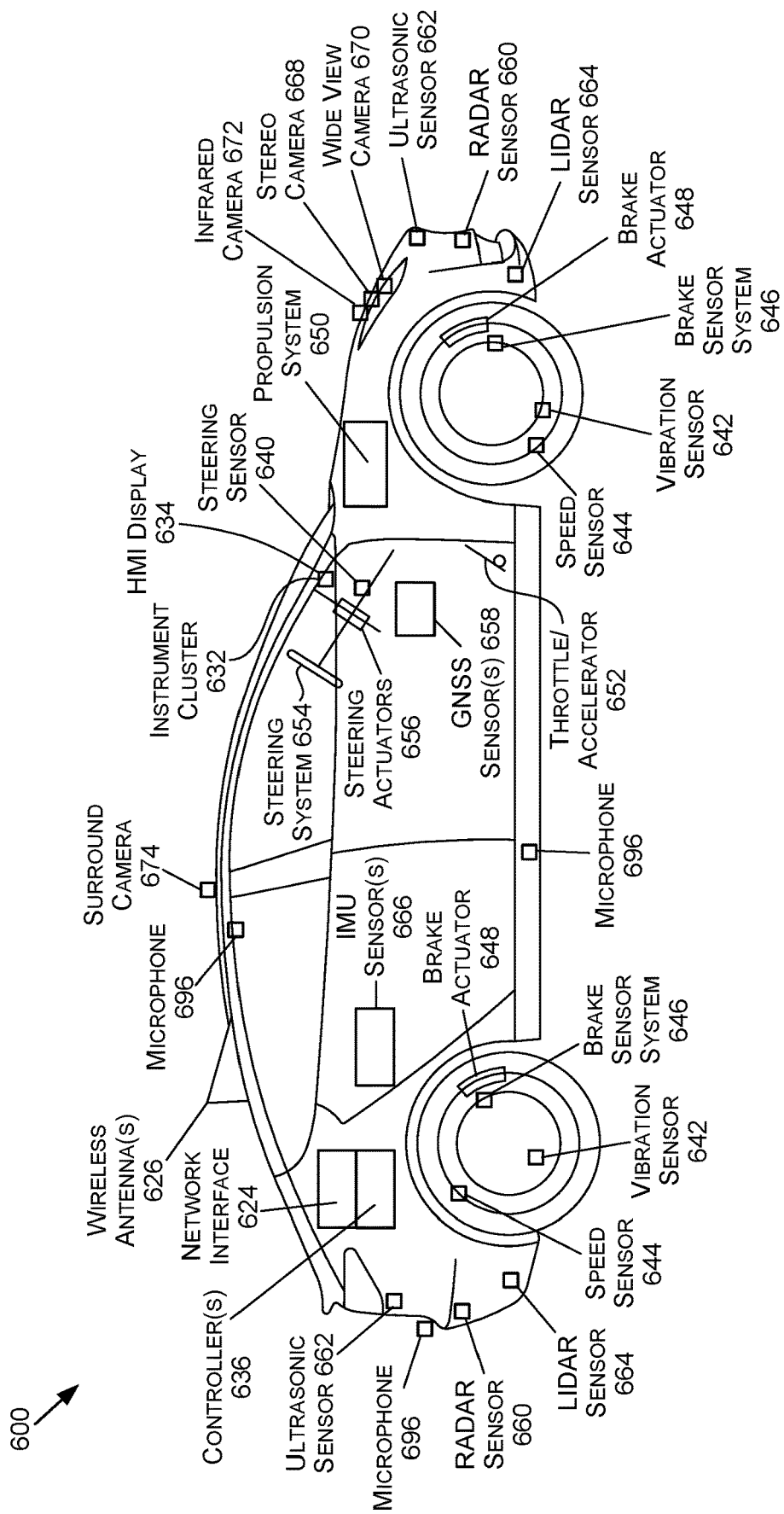
FIG. 6A is an illustration of an example autonomous vehicle, in accordance with some embodiments of the present disclosure.
Figure 6B:
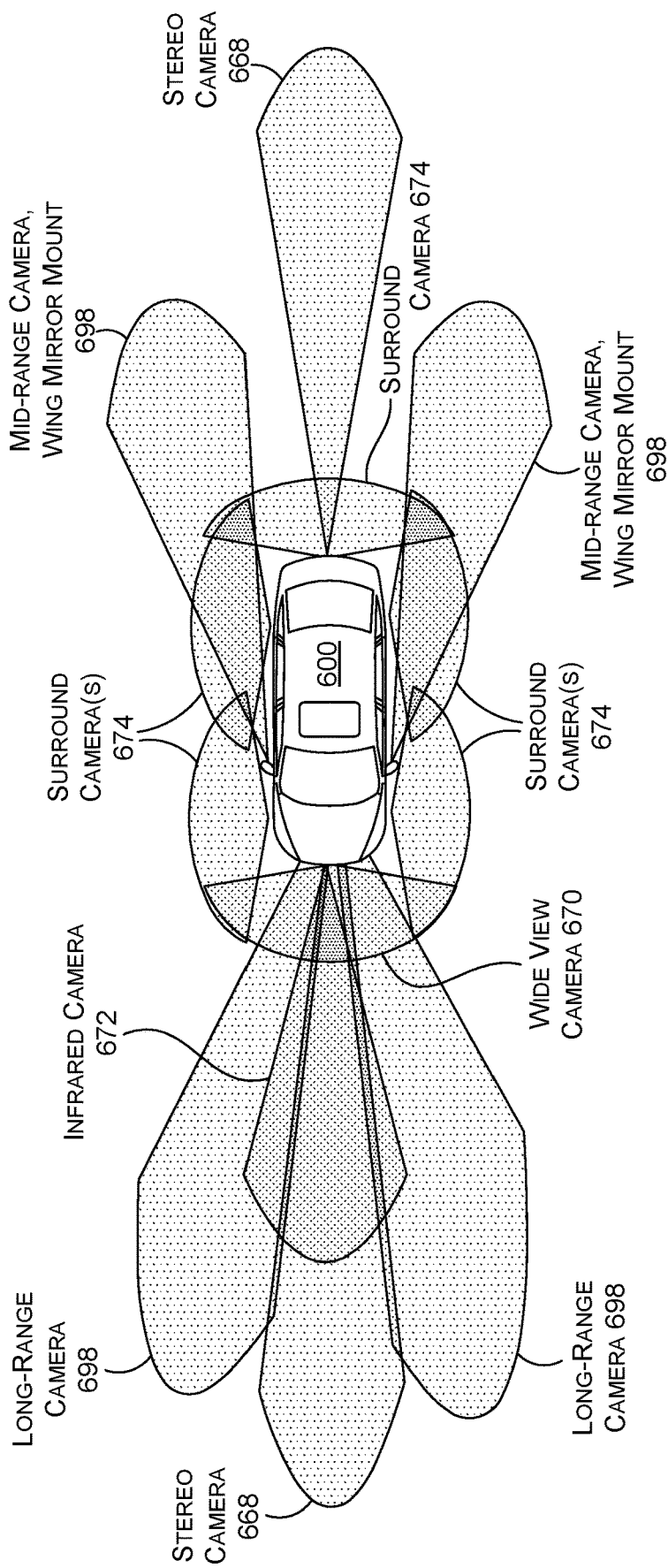
FIG. 6B is an example of camera locations and fields of view for the example autonomous vehicle of FIG. 6A, in accordance with some embodiments of the present disclosure.

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3—Level 5 of the autonomous driving levels. For example, the vehicle 600 may be capable of conditional automation (Level 3), high automation (Level 4), and/or full automation (Level 5), depending on the embodiment.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope (s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the HD map 622 of FIG. 6C), location data (e.g., the vehicle's 600 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624 which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 600. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
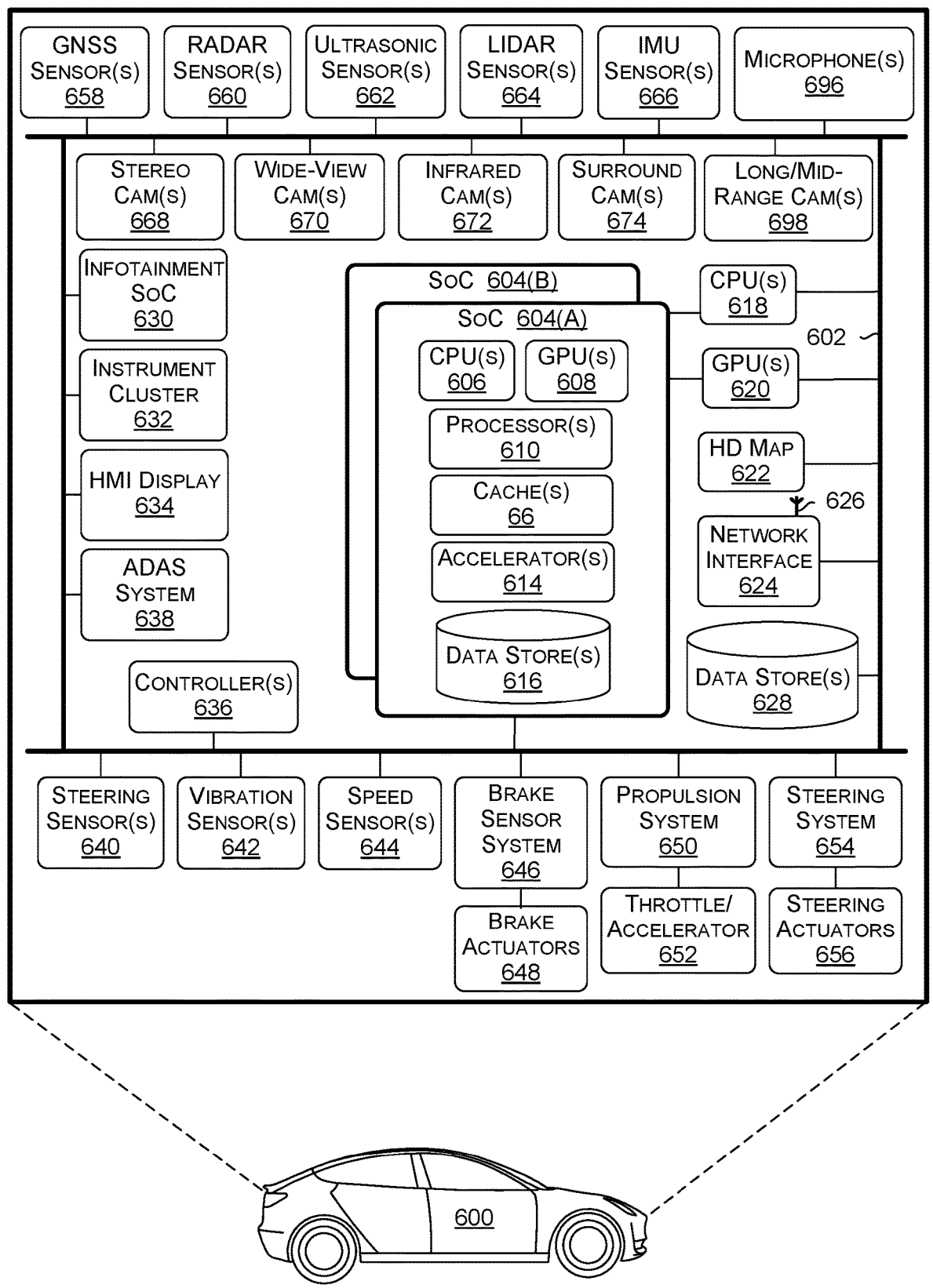
FIG. 6C is a block diagram of an example system architecture for the example autonomous vehicle of FIG. 6A, in accordance with some embodiments of the present disclosure.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C are illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600, and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX").

The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include an arithmetic logic unit(s) (ALU(s)) which may be leveraged in performing processing with respect to any of the variety of tasks or operations of the vehicle 600—such as processing DNNs. In addition, the SoC(s) 604 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 606 and/or GPU(s) 608.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS, assisted GPS sensors, differential GPS (DGPS) sensors, etc.), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 600 surroundings at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 600 m, with an accuracy of 2 cm-3 cm, and with support for a 600 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 120-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 600 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 600. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
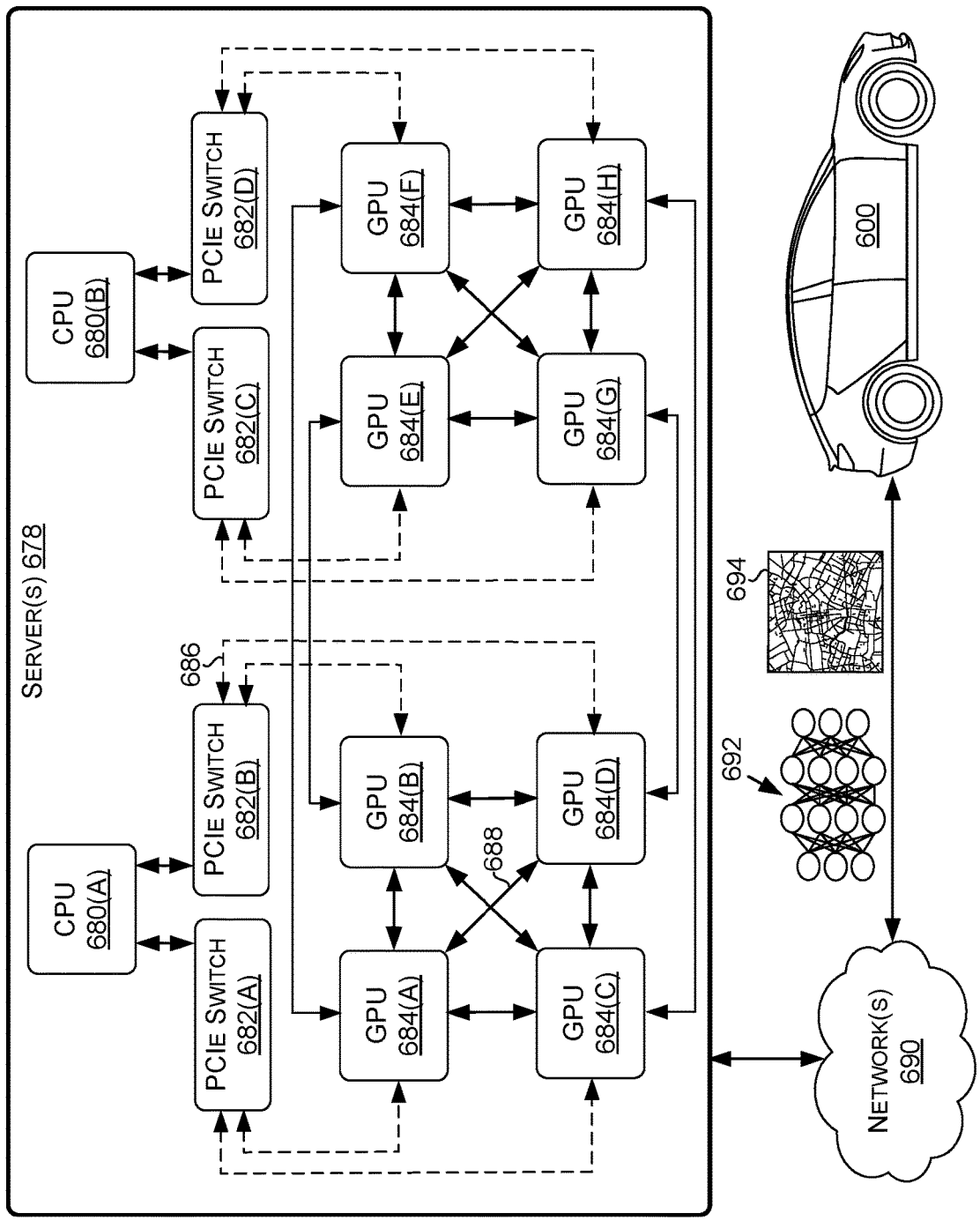
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
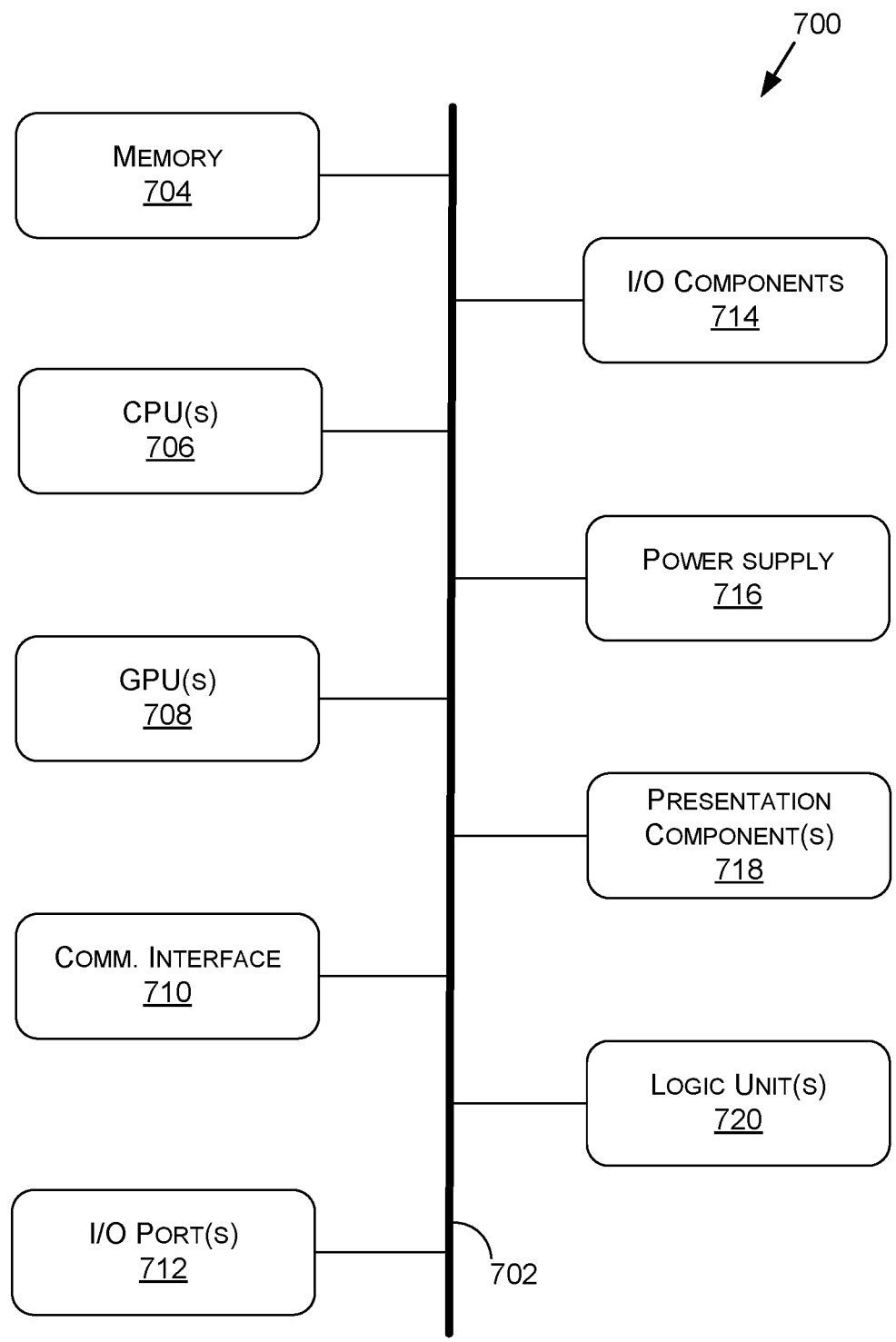
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

Example Data Center

Figure 8:
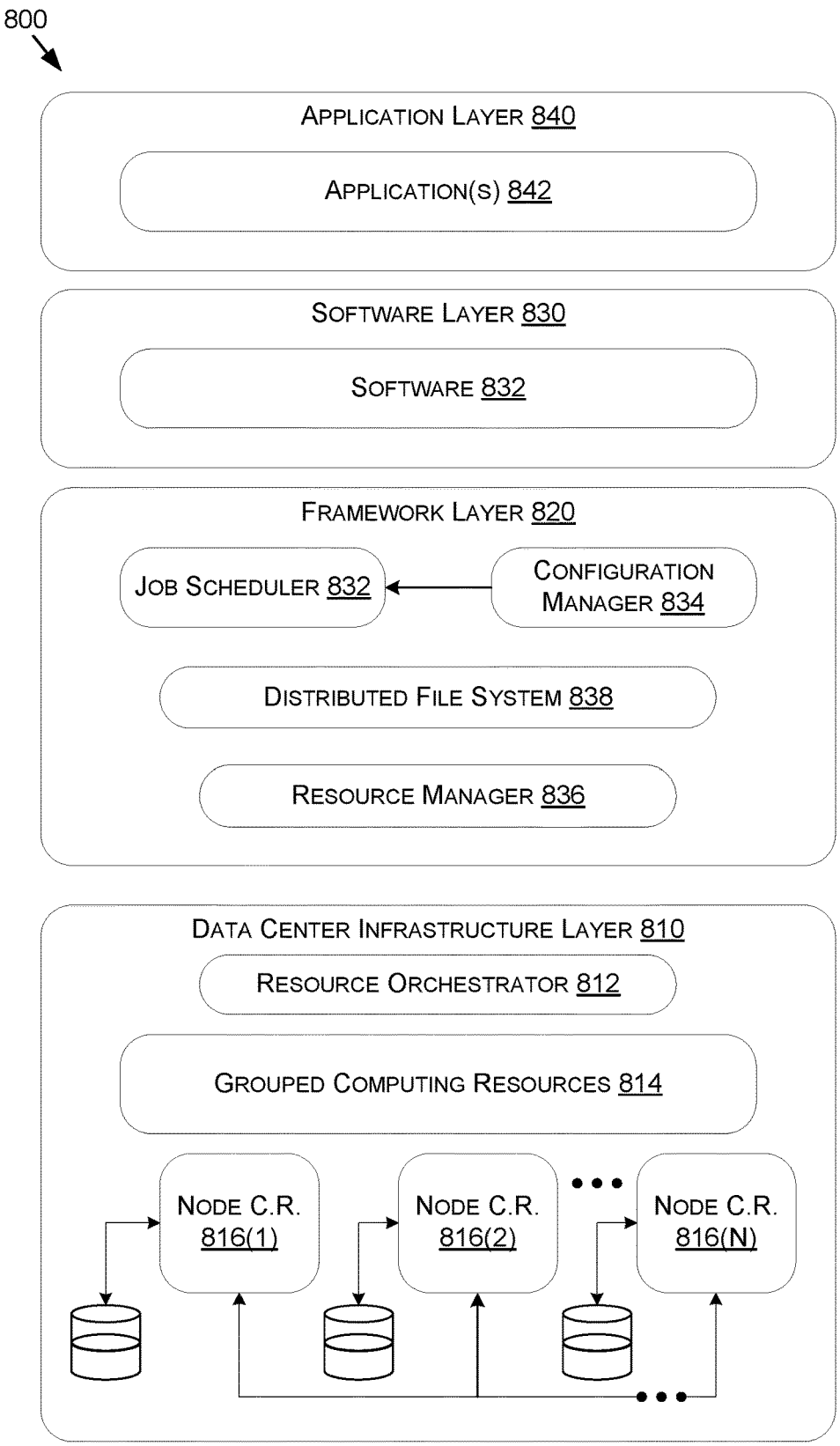
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, and/or other processors may be grouped within one or more racks to provide compute resources to support one or more workloads. The one or more racks may also include any number of power modules, cooling modules, and/or network switches, in any combination.

The resource orchestrator 822 may configure or otherwise control one or more node C.R.s 816(1)-816(N) and/or grouped computing resources 814. In at least one embodiment, resource orchestrator 822 may include a software design infrastructure ("SDI") management entity for the data center 800. The resource orchestrator 822 may include hardware, software, or some combination thereof.

In at least one embodiment, as shown in FIG. 8, framework layer 820 may include a job scheduler 832, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. The resource manager 1036 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   generating, based at least on sensor data generated using one or more sensors of a machine, a point cloud associated with an environment;
   determining, using one or more bounding shapes and based at least on one or more points of the point cloud, a location of a perturbation within the environment; and
   causing, based at least on the location of the perturbation, the machine to perform one or more operations.

2. The method of claim 1, further comprising:
   determining a free-space region associated with the environment,
   wherein the point cloud is associated with the free-space region associated with the environment.

3. The method of claim 1, wherein the determining the location of the perturbation within the environment comprises:
   determining, using the one or more bounding shapes and based at least on the one or more points of the point cloud, one or more heights relative to a surface; and
   determining, based at least on the one or more heights relative to the surface, the location of the perturbation within the environment.

4. The method of claim 3, wherein the determining the location of the perturbation within the environment comprises:
   determining that the one or more heights satisfy a threshold height above the surface; and
   determining, based at least on the one or more heights satisfying the threshold height above the surface, the location of the perturbation as corresponding to at least one location of one or more locations associated with the one or more bounding shapes within the environment.

5. The method of claim 3, wherein the determining the location of the perturbation within the environment comprises:
- determining that the one or more heights satisfy a threshold height below the surface; and
- determining, based at least on the one or more heights satisfying the threshold height below the surface, the location of the perturbation as corresponding to at least one location of one or more locations associated with the one or more bounding shapes within the environment.

6. The method of claim 1, wherein the determining the location of the perturbation within the environment comprises:
- determining, using a first bounding shape of the one or more bounding shapes and based at least on one or more first points of the one or more points, a first height relative to a surface;
- determining, using a second bounding shape of the one or more bounding shapes and based at least on one or more second points of the one or more points, a second height relative to the surface;
- determining that a first location associated with the first bounding shape is within a threshold distance to a second location associated with the second bounding shape; and
- determining, based at least on the first location being within the threshold distance to the second location, the location of the perturbation within the environment using the first height relative to the surface and the second height relative to the surface.

7. The method of claim 1, further comprising:
- determining, based at least on the location of the perturbation, a geometry associated with the perturbation,
- wherein the causing the machine to perform the one or more operations is based at least on the geometry of the perturbation.

8. The method of claim 1, wherein the determining the location of the perturbation within the environment comprises:
- determining, using the one or more bounding shapes and based at least on the one or more points of the point cloud, a surface profile associated with the environment; and
- determining, based at least on the surface profile, the location of the perturbation within the environment.

9. The method of claim 1, further comprising:
- generating a heatmap indicating at least the location of the perturbation within the environment,
- wherein the causing the machine to perform the one or more operations is based at least on the heatmap.

10. The method of claim 1, wherein the perturbation comprises at least one of a bump, a hump, a dip, or a hole associated with a road of the environment.

11. A system comprising:
- one or more processing units to:
  - generate, based at least on sensor data generated using one or more sensors of a machine, a point cloud associated with an environment;
  - determine, using one or more bounding shapes and based at least on one or more points of the point cloud, a surface profile associated with the environment; and
  - cause, based at least on the surface profile, the machine to perform one or more operations.

12. The system of claim 11, wherein the one or more processing units are further to:
- determine a free-space region associated with the environment,
- wherein the point cloud is associated with the free-space region associated with the environment.

13. The system of claim 11, wherein the determination of the surface profile associated with the environment comprises:
- determining, using the one or more bounding shapes and based at least on the one or more points of the point cloud, one or more heights relative to a surface; and
- determining, based at least on the one or more heights relative to the surface, the surface profile associated with the environment.

14. The system of claim 11, wherein the one or more bounding shapes include at least a first bounding shape located a first distance from the machine and a second bounding shape located a second distance from the machine.

15. The system of claim 11, wherein the one or more processing units are further to:
- determine, based at least on the surface profile, a location of a perturbation within the environment,
- wherein the machine is caused to perform the one or more operations based at least on the location of the perturbation.

16. The system of claim 11, wherein the one or more processing units are further to:
- determine, based at least on the surface profile, a geometry of a perturbation within the environment,
- wherein the machine is caused to perform the one or more operations based at least on the geometry of the perturbation.

17. The system of claim 11, wherein the system is implemented within at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system incorporating one or more virtual machines (VMs);
- a system implemented using a robot;
- a system implemented at least partially in a data center; or
- a system implemented at least partially using cloud computing resources.

18. A processor comprising:
- one or more processing units to cause a machine to perform one or more operations based on at least one of a location of a perturbation within an environment or a geometry of the perturbation within the environment, wherein the at least one of the location or the geometry is determined using one or more bounding shapes and based at least on a point cloud associated with the environment.

19. The processor of claim 18, wherein the one or more processing units are further to:
- determine, using the one or more bounding shapes and based at least on one or more points of the point cloud, one or more heights relative to a surface,
- wherein the at least one of the location or the geometry of the perturbation within the environment is determined based at least on the one or more heights relative to the surface.

20. The processor of claim 18, wherein the processor is implemented within at least one of:

a control system for an autonomous or semi-autonomous machine;
a perception system for an autonomous or semi-autonomous machine;
a system for performing simulation operations;
a system for performing deep learning operations;
a system implemented using an edge device;
a system incorporating one or more virtual machines (VMs);
a system implemented using a robot;
a system implemented at least partially in a data center; or
a system implemented at least partially using cloud computing resources.

* * * * *